United States Patent
Bicek

[11] 4,107,519
[45] Aug. 15, 1978

[54] OPTICAL CONTROL SYSTEM FOR HIGH-VOLTAGE TERMINALS

[75] Inventor: John J. Bicek, Tinley Park, Ill.

[73] Assignee: The United States of America as represented by the United States Department of Energy, Washington, D.C.

[21] Appl. No.: 787,129

[22] Filed: Apr. 13, 1977

[51] Int. Cl.$^2$ .......................... H04B 9/00; H02N 1/00; H04Q 9/12
[52] U.S. Cl. ..................... 250/199; 310/309; 340/171 A; 340/171 PF
[58] Field of Search ................. 250/199; 340/171 A, 340/171 PF; 310/308, 309, 310

[56] References Cited
U.S. PATENT DOCUMENTS

| | | | |
|---|---|---|---|
| 3,473,056 | 10/1969 | Ferry | 310/309 |
| 3,493,760 | 2/1970 | Hoadley | 250/199 |
| 3,710,122 | 1/1973 | Burcher | 250/199 |

*Primary Examiner*—Howard W. Britton
*Attorney, Agent, or Firm*—Dean E. Carlson; Frank H. Jackson; Donald P. Reynolds

[57] ABSTRACT

An optical control system for the control of devices in the terminal of an electrostatic accelerator includes a laser that is modulated by a series of preselected codes produced by an encoder. A photodiode receiver is placed in the laser beam at the high-voltage terminal of an electrostatic accelerator. A decoder connected to the photodiode decodes the signals to provide control impulses for a plurality of devices at the high voltage of the terminal.

2 Claims, 1 Drawing Figure

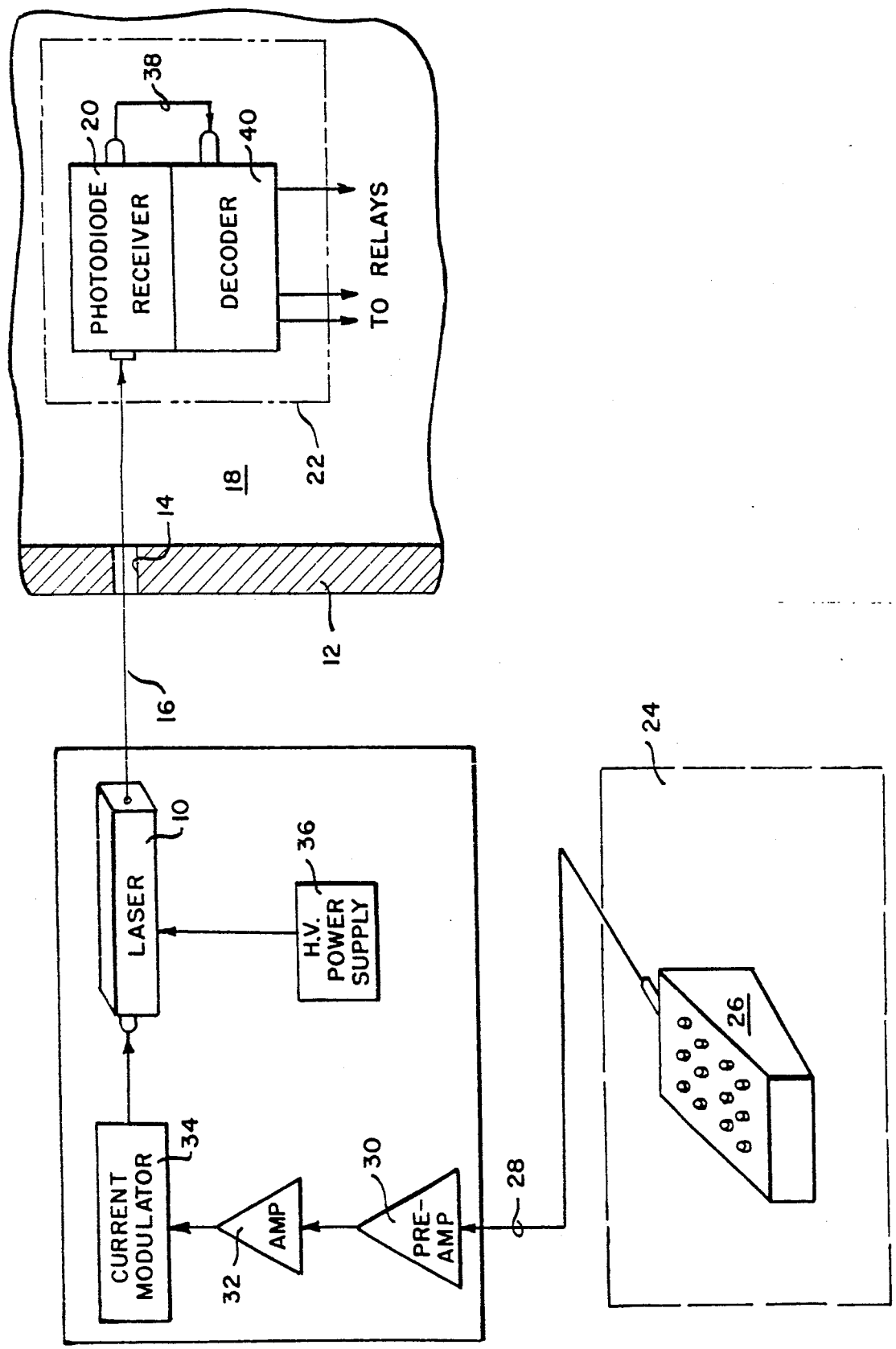

OPTICAL CONTROL SYSTEM FOR HIGH-VOLTAGE TERMINALS

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to control of devices located at the high-voltage terminal of an electrostatic accelerator such as a tandem Van de Graaff accelerator.

One of the features of the tandem Van de Graaff high-voltage electrostatic accelerator is a stripping terminal that is located at the high-voltage section at the center of the machine. In past applications this has quite frequently been a gas stripper that changes the ionization state of accelerated particles through collisions with the molecules of a gas. A number of advantages can be achieved with the use of foil strippers at the high-voltage terminal and this is especially true when accelerating heavy ions. One system that has been developed for the stripping of heavy ions is described in U.S. Pat. No. 3,806,749, "Method and Means of Effecting Charge Exchange in Particle Beams." That patent describes the use of a heated carbon foil as a stripping substance for placement in beams of particles such as nickel ions. It was disclosed in that patent that heated carbon foils could be used successfully for stripping for periods of the order of hours before it became necessary to change the foils. The necessity of controlling the heat and of operating a foil-changing mechanism at the high-voltage terminal subject to remote control from an operator at electrical ground who is removed from the radiation danger areas of the machine presents a technical challenge. The high-voltage terminal is typically at a voltage of the order of 6 to 12 million volts from electrical ground. It is common to maintain such a voltage by filling the interior of the accelerator with sulfur hexafluoride gas under a pressure of several atmospheres. Optimum use of the accelerator normally requires that the terminal be operated at voltages that are as high as the components can maintain without arcing or excessive leakage and the interior of the accelerator is likely to be very noisy electrically as a result of stray discharges.

One system that has been applied to control elements at the high voltage terminal uses a light pipe as the medium of communication between equipment at electrical ground and equipment at the high voltage terminal. The light pipe is capable of withstanding high voltages in the lengths that are normally necessary to reach the high voltage terminal and it passes physically through the atmosphere within the accelerator. However, an insulator between several million volts and ground requires the usual precautions to equalize voltage drops along its length. This is normally a string of electrical resistors in series, with each one connected at one end to the structure to be equalized so as to provide equalized voltage drops at spaces along the light pipe. This is a costly item and introduces an extra loading element to be supplied by the charging belt or chain of the accelerator. It also offers another element that can initiate an arc to threaten the continued operation of the accelerator.

It is an object of the present invention to provide a better way of controlling elements at the high-voltage terminal of an electrostatic accelerator.

It is a further object of the present invention to provide a means of controlling elements at the high-voltage terminal of a tandem electrostatic accelerator without making a direct physical connection between the terminal and electrical ground.

Other objects will become apparent in the course of a detailed description of the invention.

SUMMARY OF THE INVENTION

Equipment at the high-voltage terminal of a tandem electrostatic accelerator is controlled remotely by applying coded modulation to the beam of a laser. The laser is located outside the accelerator and its beam is directed through a window to a receiver at the high-voltage terminal. The receiver is connected to a decoder which applies the decoded signal to an appropriate relay for control of desired functions at the high-voltage terminal.

BRIEF DESCRIPTION OF THE DRAWING

The drawing is a schematic representation of an apparatus for practice of the present invention.

DETAILED DESCRIPTION OF THE INVENTION

The drawing shows a schematic representation of an apparatus for the practice of the invention. In the drawing laser 10 is located outside the tank 12 of a tandem high-voltage accelerator. A port 14 admits a beam 16 from laser 10 into the interior 18 of the tandem accelerator. The interior 18 is typically filled with sulfur hexafluoride gas at a pressure of several atmospheres. Beam 16 is directed at a phototube receiver 20 which is located at high-voltage terminal 22. In the operation of the tandem accelerator, high-voltage terminal 22 is caused to assume a high voltage by the physical conduction of electric charges by a belt or chain. This is well known and needs no further illustration to describe the present invention. It is, however, evident that any physical connection between terminal 22 and tank 12 or any other electrically grounded item provides a path for loss of charge that will reduce the ultimate voltage of the terminal and that also provides a possible path for electrical breakdown that could threaten continued operation of the accelerator until it was repaired. One consequence of this is that it is common to make no direct electrical connections between the tank 12 and the high voltage terminal 22 but to supply electricity for those items of equipment that needed to be operated electrically at terminal 22 by driving an electrical generator through the belt drive to produce electrical energy at the d-c potential of the terminal.

The equipment that is to be controlled at the high-voltage terminal 22 is selected by an operator at a remote location 24. This will typically be the control room of the tandem accelerator but, in any case, must be a location that does not present a threat of harmful radiation to an operator. An encoder 26 is located at remote location 24 and is connected by wires 28 to a preamplifier 30 which, in turn, is connected to an amplifier 32. The output of amplifier 32 controls a current modulator 34 which modulates beam 16 from laser 10 according to the control selected at encoder 26 by an operator. A high-voltage power supply 36 supplies an operating voltage for laser 10. It will normally be convenient to locate preamplifier 30, amplifier 32, current modulator 34 and high-voltage supply 36 in the radiation environment of the tandem accelerator to place them conveniently close to laser 10. The beam 16 from laser 10 that is detected at phototube receiver 20 is coupled through wire 38 to decoder 40 which selects a desired impulse to actuate relays under the control of encoder 26. Functions of these relays include, but are not limited to, turning a foil heater off or on, removing a failed foil and inserting a new one, and the like.

The apparatus of the drawing has been built and used on the FN Tandem Van de Graaff Accelerator at The Argonne National Laboratory. The laser 10 was an amplitude-modulated low-power helium-neon laser. Encoder 26 was a standard telephone tone generator sold under the trademark Touch-tone, available commercially. The receiver was a Metrologic 60-247 photocell receiver and the decoder 40 was a Bramco MD 47 C decoder. The laser 10 was approximately 23 meters from the phototube of the phototube receiver 20 and the sulfur hexafluoride in the tandem accelerator was presssurized to a nominal pressure of 75 psig (about 500,000 Pag). The apparatus was used to test its operation in preparation for later installation of foil strippers and associated equipment. Tests were run by controlling the rotation of two disks at the high-voltage terminal. Each of the disks had a number of holes through which light could pass when holes in both disks were aligned. This allowed visual inspection to check operation of the control system of the present invention. The system was effective with the high-voltage terminal maintained at 7 MV over a period of about 30 hours. During this period a number of sparks occurred without affecting operation of the control system.

The embodiments of the invention in which an exclusive property or privilege is claimed are defined as follows:

1. An optical system for the control of devices at the terminal of an electrostatic accelerator comprising:
    a laser disposed outside the tank of the electrostatic accelerator at an optical port and having a beam directed at the terminal;
    an encoding system connected electrically to the laser to modulate the beam according to a predetermined scheme;
    a receiver at the terminal coupled optically to the beam to generate a signal containing the modulation of the beam; and
    a decoder connected to the receiver to decode the signal and generate control signals according to the predetermined scheme,
which control signals will control devices at the terminal.

2. The apparatus of claim 1 wherein the encoding system comprises:
    a push-button tone generator;
    means connected to the tone generator for amplifying an output of the tone generator; and
    a current modulator connected to the means for amplifying and to the laser to modulate the beam of the laser according to the output of the tone generator.

* * * * *